United States Patent [19]

Terada et al.

[11] Patent Number: 5,247,003
[45] Date of Patent: Sep. 21, 1993

[54] ETHYLENE-PROPYLENE COPOLYMER BASED RESIN COMPOSITION SUITABLE FOR AUTOMOBILE BUMPERS

[75] Inventors: Masahiro Terada, Kanagawa; Hideyo Morita, Tokyo; Kohei Ueno; Kazuyoshi Tanaka, both of Osaka, all of Japan

[73] Assignees: Nissan Motor Co., Ltd.; Ube Industries Ltd., Japan

[21] Appl. No.: 718,671

[22] Filed: Jun. 21, 1991

[30] Foreign Application Priority Data

Jun. 27, 1990 [JP] Japan .................... 2-166869

[51] Int. Cl.$^5$ .................... C08L 53/02; C08K 3/00
[52] U.S. Cl. .................... 524/451; 524/505; 525/98
[58] Field of Search .................... 524/451, 505

[56] References Cited

U.S. PATENT DOCUMENTS

| | | | |
|---|---|---|---|
| 4,439,573 | 3/1984 | Fukui et al. | 524/451 |
| 4,687,804 | 8/1987 | Shiraishi et al. | 524/505 |
| 4,707,514 | 11/1987 | Katsuki et al. | 524/505 |
| 4,737,536 | 4/1988 | Kawase et al. | 524/505 |
| 5,001,182 | 3/1991 | Maruya et al. | 524/505 |
| 5,086,109 | 2/1992 | Ueno et al. | 524/496 |

FOREIGN PATENT DOCUMENTS

57-55952 4/1982 Japan .
58-111846 7/1983 Japan .
59-98157 6/1984 Japan .

*Primary Examiner*—Paul R. Michl
*Assistant Examiner*—Olga Asinovsky
*Attorney, Agent, or Firm*—Lowe, Price, LeBlanc & Becker

[57] ABSTRACT

The invention provides a moldable resin composition comprising (A) 50-73 wt % of a crystalline ethylene-propylene block copolymer in which the content of ethylene is 5-15 wt %, (B) 10-20 wt % of a hydrogenated block copolymer consisting of (i) 10-40 wt % of blocks of an aromatic vinyl compound polymer and (ii) 90-60 wt % of blocks of a conjugated diene polymer, (C) 2-7 wt % of an amorphous ethylene-propylene copolymer in which the content of propylene is 20-30 wt % and (D) 15-25 wt % of talc, with the proviso that the total amount of (B) and (C) is 12-25 wt %. The particulars of the components (A) to (D), including the degree of solubility of the polypropylene component of the block copolymer (A), the degree of hydrogenation of each of the blocks (i) and (ii) of the copolymer (B), Mooney viscosity of the copolymer (C) and the particle size distribution of the talc (D), are strictly specified. The resin composition can be molded into automobile bumpers which are good in appearance and paint coatability and sufficiently high in both rigidity and impact resistance.

37 Claims, 2 Drawing Sheets

ETHYLENE-PROPYLENE COPOLYMER BASED RESIN COMPOSITION SUITABLE FOR AUTOMOBILE BUMPERS

BACKGROUND OF THE INVENTION

This invention relates to an ethylene-propylene copolymer based resin composition which is good in moldability and provides molded articles high in both rigidity and impact resistance. The resin composition is suitable for molding into automobile bumbers.

In the current automobiles the bumper material has been changed from steel to synthetic resins such as polyurethane based resins or polypropylene based resins. The main objects of using resin bumpers are reducing the weight, preventing rusting and augmenting the freedom of design.

However, automobile bumpers formed of conventional resins are generally insufficient in rigidity and hence need to be reinforced by inserting metal reinforcements. Meanwhile, the current automobiles tend to become larger in body size to satisfy the requirements for higher performance and consequently become heavier in gross weight, whereas still there is a strong demand for further improvements in fuel economy. Therefore, it is advantageous to reduce the weight of various parts of automobiles, including bumpers, without sacrificing the performance.

Resin bumpers for automobiles are required to be high in both ridigity and impact resistance even at considerably low temperatures. Recently there are several proposals of polypropylene based resin compositions which are fairly high in the impact resistnce of the molded products such as automobile bumpers, as disclosed in JP 57-55952 A, JP 58-111846 A and JP 59-98157 A. However, bumpers formed of any of these resin compositions are insufficient in rigidity for restricting the amount of deformation in case of a collision and hence need to be reinforced by the insertion of metal reinforcements.

SUMMARY OF THE INVENTION

It is an object of the present invention to provide an ethylene-propylene copolymer based resin composition, which is suitable as a molding material for producing automobile bumpers and can provide automobile bumpers that are good in appearance and paint coatability and sufficiently high in both rigidity and impact resistance and hence do not need metal reinforcements.

According to the invention the above object is accomplished by employing a crystalline ethylene-propylene block copolymer, a hydrogenated block copolymer of an aromatic vinyl compound and a conjugated diene, an amorphous ethylene-propylene coplymer and talc as the essential components of a resin composition, strictly specifying the important characteristics of these components, respectively, and blending these components in specific proportions.

More definitely, the present invention provides a resin composition suitable for molding into automobile bumpers, the resin composition comprising:

(A) 50-73 wt % of at least one crystalline ethylene-propylene block copolymer which contains 5-15 wt % of ethylene and has a melt flow index of 10-50 g/10 min at 135° C. under load of 2.16 kg, at least 93 wt % but less than 97 wt % of the polypropylene component of the block copolymer being insoluble in boiling n-heptane, a fraction of the block copolymer which is soluble in p-xylene at normal temperature having an intrinsic viscosity not lower than 2.5 in decahydronaphthalene at 135° C.;

(B) 10-20 wt % of at least one hydrogenated block copolymer which consists of (i) 10-40 wt % of first blocks of a polymer of an aromatic vinyl compound and (ii) 90-60 wt % of second blocks of a polymer of a conjugated diene and has a melt flow index not lower than 1 g/10 min at 230° C. under load of 2.16 kg, not more than 5 mol % of the first blocks and at least 90 mol % of the second blocks being hydrogenated;

(C) 2-7 wt % of an amorphous ethylene-propylene copolymer which contains 20-30 wt % of propylene and has a Mooney viscosity, $ML_{1+4}(100°\ C.)$, in the range from 10 to 30; and (D) 15-25 wt % of talc which has a median particle size, $D\rho_{50}$, in the range from 1.5 to 3.0 $\mu$m, the particle size distribution of the talc being such that particles smaller than 10 $\mu$m amount to 100 wt %, that the amount of particles not larger than 7 $\mu$m is not less than 90 wt % and that the amount of particles not larger than 1 $\mu$m is not more than 10 wt %;

with the proviso that the total amount of the hydrogenated block copolymer(s) (B) and the amorphous ethylene-propylene copolymer (C) falls in the range from 12 to 25 wt % of the resin composition.

The resin composition according to the invention is good in moldability and sufficiently high in both elastic modulus and impact resistance. That is, this resin composition becomes not lower than 17000 kg/cm$^2$ in modulus of elasticity in bending and not lower than 6 kg-cm/cm in Izod impact strength at $-30°$ C., and not lower than 420 kg-cm in the resistance to a high-speed falling weight impact at $-40°$ C. by a testing method employed in the examples of the invention described hereinafter. This resin composition can be molded, for example, by injection molding into various articles including large-sized articles such as automobile bumpers. By molding a resin composition according to the invention by a conventional method it is possible to form automobile bumpers which are good in appearance and paint coatability and sufficiently high in both rigidity and impact resistance and, hence, do not need to be reinforced by the insertion of metal reinforcements.

DETAILED DESCRIPTION OF THE INVENTION

Figure 1:
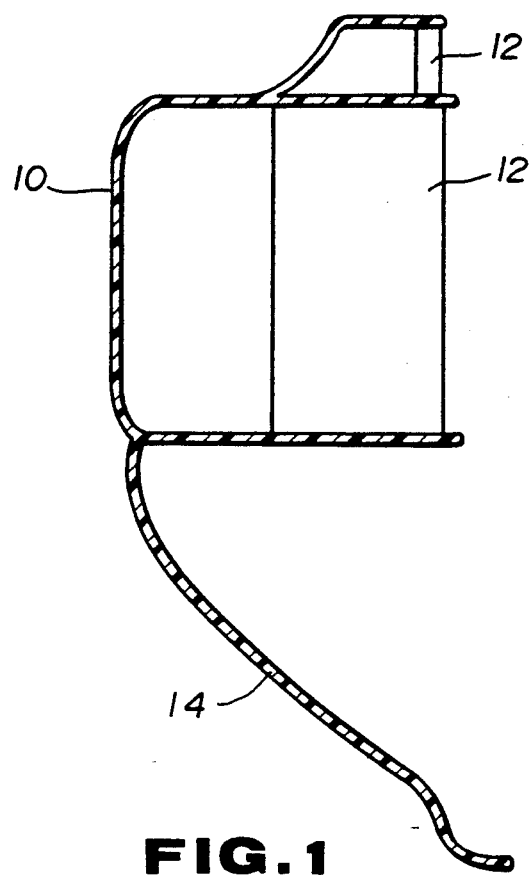
FIG. 1 is a vertical sectional view of an example of automobile bumpers which can be produced by molding a resin composition according to the invention.

In the present invention the essential components of the resin composition are of the following particulars.

(A) Crystalline Ethylene-Propylene Block Copolymer

This component occupies 50-73 wt % of the resin composition. If the amount of this component is less than 50 wt % the resin composition is unsatisfactory in fluidity and moldability when it is melted for injection molding so that the molded products may not have good appearance, and if it exceeds 73 wt % it becomes difficult to realize a good balance between rigidity and impact resistance of the molded products of the resin composition. To obtain a resin composition which can easily be molded into automobile bumpers sufficiently high in rigidity and good in other properties such as impact resistance, appearance and paint coatability the amount of this component should be limited within the range from 50 to 73 wt %, and preferably within the range from 54 to 68 wt %. It is optional to jointly use two or more kinds of crystalline ethylene-propylene block copolymers each of which satisfies the following requirements, with the proviso that the total amount of the jointly used copolymers is 50-73 wt % of the resin composition.

In the crystalline ethylene-propylene block copolymer the content of ethylene is 5-15 wt %, and preferably 5-10 wt %. The resin composition becomes insufficient in impact resistance if the content of ethylene is less than 5 wt % and insufficient in the rigidity of the molded products if the content of ethylene is more than 15 wt %.

There is a restriction on the solubility of the polypropylene component of the crystalline ethylene-propylene block copolymer in boiling n-heptane. That is, at least 93 wt % but less than 97 wt % of the polypropylene component should be insoluble in boiling n-heptane. The polypropylene component refers to the crystalline polypropylene used for preparing the block copolymer. If the insoluble part is less than 93 wt % the resin composition may become lower than 17000 kg/cm$^2$ in modulus of elasticity in bending, but if it is not less than 97 wt % the resin composition becomes insufficient in impact resistance.

A fraction of the crystalline ethylene-propylene block copolymer is soluble in p-xylene at normal temperature, and it is necessary that the intrinsic viscosity of the p-xylene soluble fraction in decahydronaphthalene at 135° C. is not lower than 2.5, and preferably not lower than 3.5. If the intrinsic viscosity of that fraction is lower than 2.5 the resin composition may become insufficient in impact resistance.

The melt flow index of the crystalline ethylene-propylene block copolymer should be in the range from 10 to 50 g/10 min at 230° C. under load of 2.16 kg. If the melt flow index is below 10 g/10 min the resin composition is insufficient in fluidity and moldability when it is melted for injection molding so that the molded products may not have good appearance, and if it exceeds 50 g/10 min the molded products become insufficient in impact resistance. It is preferable that the melt flow index falls in the range from 10 to 40 g/10 min.

(B) Hydrogenated Block Copolymer

The resin composition contains 10-20 wt % of a hydrogenated block copolymer which consists of (i) 10-40 wt % of first blocks of a polymer of an aromatic vinyl compound and (ii) 90-60 wt % of second blocks of a polymer of a conjugated diene, and in which not more than 5 mol % of the first blocks and at least 90 mol % of the second blocks are hydrogenated. The melt flow index of the hydrogenated block copolymer should be at least 1 g/10 min at 230° C. under load of 2.16 kg. If the melt flow index is below 1 g/10 min the block copolymer cannot be well dispersed in the crystalline ethylene-propylene block copolymer (A), whereby the resin composition becomes insufficient in impact resistance. It is preferable that the melt flow index is not lower than 5 g/10 min. It is optional to jointly use two or more kinds of hydrogenated block copolymers each of which satisfies the above requirements with the proviso that the total amount of the jointly used copolymers is 10-20 wt % of the resin composition. If the amount of the component (B) is less than 10 wt % the resin composition is insufficient in impact resistance, and if it exceeds 20 wt % the molded products of the resin composition are insufficient in rigidity. It is preferable that the component (B) occupies 12-18 wt % of the resin composition.

As to the blocks (i) of the hydrogenated copolymer, examples of suitable aromatic vinyl compound polymers are polystyrene, poly-α-methylstyrene, poly-p-methylstyrene and polychlorostyrene, and polystyrene is preferred. As to the blocks (ii), examples of suitable conjugated diene polymers are polybutadiene, polyisoprene and polychloroprene, and it is preferred to use polybutadiene or polyisoprene.

If the amount of the blocks (i) in the block copolymer (B) is less than 10 wt % the rigidity of the molded products of the resin composition becomes insufficient, and if it is more than 40 wt % the impact resistance of the resin composition becomes insufficient. It is preferable that the amount of the blocks (i) is not more than 30 wt % of the block copolymer (B). The hydrogenation of the block copolymer (B) can be accomplished by a well known method. If the degree of hydrogenation of the polydiene blocks (ii) does not reach 90 mol % the molded products of the resin composition may not be good in weatherability. It is preferable that at least 97 mol % of the blocks (ii) is hydrogenated. Hydrogenated block copolymers suitable for use as the component (B) in the present invention are available as commercial products such as, for example, KRATON G of Shell Chemicals Co. and SEPTON of Kurare Co.

(C) Amorphous Ethylene-Propylene Copolymer

This component occupies 2-7 wt % of the resin composition. It is necessary to use an amorphous ethylene-propylene copolymer which contains 20-30 wt % of propylene and has a Mooney viscosity, $ML_{1+4}(100°$ C.), of 10-30.

If the content of propylene is less than 20 wt % the copolymer (C) tends to exhibit crystallinity of polyethylene so that the resin composition may not be sufficient in impact resistance. If the propylene content exceeds 30 wt % the copolymer becomes too soft, whereby the resin composition becomes insufficient in the rigidity of the molded products. If the Mooney viscosity of the copolymer (C) is lower than 10 the copolymer is too low in molecular weight and hence can hardly afford good impact resistance to the resin compostion. If the Mooney viscosity is higher than 30 the copolymer (C) is too high in molecular weight and hence is hard to well disperse in the crystalline ethylene-propylene block copolymer (A), whereby the resin composition becomes insufficient in impact resistance and/or surface gloss of the molded products. It is preferable that the Mooney viscosity of the copolymer (C) falls in the range from 10 to 25.

If the amount of the component (C) is less than 2 wt % the resin composition becomes insufficient in impact resistance and not good in paint coatability of the molded products, and if it exceeds 7 wt % the molded products become insufficient in rigidity. It is preferable that the component (C) occupies 3-5 wt % of the resin composition. Furthermore, in the resin composition the total amount of the hydrogenated block copolymer (B) and the amorphous ethylene-propylene copolymer (C) should fall in the range from 12 to 25 wt %, and preferably in the range from 15 to 22 wt %. If the total amount of the components (B) and (C) is less than 12 wt % the resin composition is insufficient in impact resistance and not good in paint coatability of the molded products, and if it exceeds 25 wt % the molded products become insufficient in rigidity.

(D) Talc

The resin composition contains 15-25 wt % of talc. If the amount of talc is less than 15 wt % the resin composition becomes lower than 17000 kg/cm$^2$ in modulus of elasticity in bending, and if it exceeds 25 wt % the resin composition becomes insufficient in impact resistance and unsatisfactory in the appearance of the molded products. It is preferable that the resin composition contains 17-24 wt % of talc.

The talc is required to have a median particle size, $Dp_{50}$, in the range from 1.5 to 3.0 μm. If the median particle size is smaller than 1.5 μm it is difficult to uniformly disperse the talc in the resin composition, so that the resin composition becomes insufficient in impact resistance. If the median particle size is larger than 3.0 μm the resin composition is insufficient in impact resistance although the talc can well be dispersed in the resin composition. Furthermore, in the present invention the particle size distribution of the talc is a matter of importance. That is, the talc is required to be at least 90 wt % in the amount of particles not larger than 7 μm and not more than 10 wt % in the amount of particles not larger than 1 μm and not to contain particles not smaller than 10 μm. If these requirements are not completely satisfied the resin composition becomes insufficient in the impact resistance and rigidity of the molded products. It is suitable to measure the particle size distribution of talc and determine the median particle size, $Dp_{50}$, with a particle size analyzer of the centrifugal sedimentation type.

The talc (D) may optionally be subjected to a surface treatment with a conventional treating agent insofar as the treatment is not against the purpose of incorporating talc in the resin composition. For example, the talc may be treated with a silane coupling agent, a higher fatty acid, a fatty acid metal salt, an unsaturated organic acid or a derivative thereof, an organic titanate or polyethylene glycol.

Besides the above described essential components, small amounts of conventional additives may optionally be incorporated in a resin composition according to the invention. For example, an antioxidant, an ultraviolet ray absorbing agent, a pigment, a coatability improving agent and/or a lubricating agent may be added at the stage of mixing the essential components or thereafter.

Examples of useful antioxidants are 2,6-di-tert-butylphenol, 2,6-di-tert-butyl-4-methylphenol, 2,6-di-tert-butyl-4-ethylphenol, 2,6-di-tert-butyl-4-n-butylphenol, 2,6-di-tert-butyl-α-dimethylamino-p-cresol, 6-(4-hydroxy-3,5-di-tert-butylanilino)-2,4-bisoctylthio-1,3,5-triazine, n-octadecyl-3-(4'-hydroxy-3',5'-di-tert-butylphenyl)propionate, tris-(2-methyl-4-hydroxy-5-tert-butylphenyl)butane, tetrakis-[methylene-3-(3',5'-di-tert-butyl-4'-hydroxyphenyl)propionate]methane, 1,3,5-trimethyl-2,4,6-tris(3,5-di-tert-butyl-4-hydroxybenzyl)-benzene and dilaurylthiodipropionate.

Examples of useful ultraviolet ray absorbing agents are 2-hydroxy-4-n-octoxybenzophenone, 2-hydroxy-4-octadecyloxybenzophenone, 4-dodecyloxy-2-hydroxybenzophenone, 2-hydroxy-4-n-octoxybenzophenone, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole and bis(2,6-dimethyl-4-piperidyl)-sebacate.

Examples of useful pigments are black iron oxide, carbon black and titanium oxide. An example of coatability improving agents is magnesium benzoate. Examples of lubricating agents are fatty acid metal salts and fatty acid amides.

In preparing a resin composition according to the invention the mixing of the essential and optional components can easily be accomplished by a conventional machine provided with a heating means, such as Banbury mixer, single-screw extruder, twin-screw extruder or a high-speed twin-screw extruder. In most cases it is suitable to use a Banbury mixer or a high-speed twin-screw extruder for melting the polymer components and mixing all the components together. After that the resin composition may be granulated for convenience in molding operations using conventional molding machines such as injection molding machines.

Figure 4:
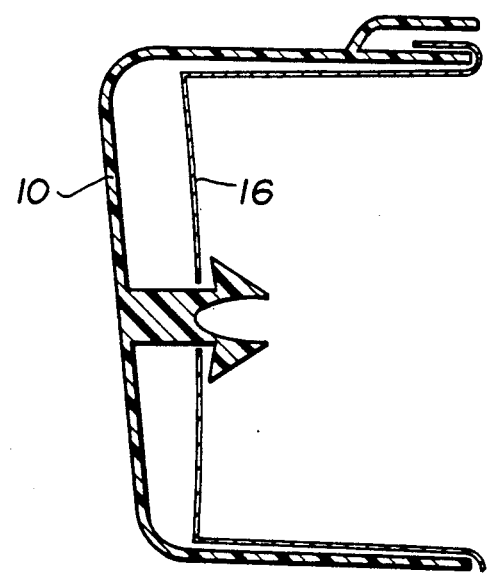
FIG. 4 is a vertical sectional view of an example of automobile bumpers produced by using a conventional resin composition.

A resin composition according to the invention is excellent in moldability, and by a conventional molding method for thermoplastic resins such as, for example, injection molding this resin composition can be molded into automobile bumpers which are sufficiently high in both rigidity and impact resistance and good in appearance and paint coatability. As shown in FIG. 1 by way of example, usually an automobile bumper 10 formed of a resin composition according to the invention has hollow ribs 12, but it is not necessary to insert metal reinforcements in the resin bumper 10. Numeral 14 indicates a facer. In the case of automobile bumpers formed of conventional ethylene-propylene copolymer based resin compositions, as shown in FIG. 4 by way of example, it is necessary to insert metal reinforcements 16 in each bumper 10 in order to make up for the insufficient rigidity of the resin bumper 10.

The following examples are illustrative of the invention, but these examples are not limitative.

EXAMPLES 1-5

Resin compositions according to the invention were prepared by selectively using two kinds of crystalline ethylene-propylene block copolymers A-1 and A-2 shown in Table 1, two kinds of hydrogenated block copolymers B-1 and B-2 shown in Table 2, two kinds of amorphous ethylene-propylene copolymers C-1 and C-2 shown in Table 3 and two kinds of talc D-1 and D-2 shown in Table 4 in the proportions shown in Tables 5 and 6. In the hydrogenated block copolymers B-1 and B-2 the blocks (i) were of polystyrene, and the blocks (ii) were of polybutadiene or polyisoprene. Tables 1 to 4 contain, besides the above named raw materials, raw materials which do not fully satisfy the requirements of the present invention but were used in the comparative examples described hereinafter.

TABLE 1

| Crystalline ethylene-propylene block copolymer | | | | |
|---|---|---|---|---|
| | A-1 | A-2 | A-3 | A-4 |
| Ethylene content (wt %) | 7.4 | 7.7 | 7.1 | 3.2 |
| The part of polypropylene component soluble in boiling n-heptane (wt %) | 94.3 | 94.5 | 97.3 | 94.0 |
| Intrinsic viscosity of the fraction soluble in p-xylene | 4.5 | 4.0 | 4.0 | 2.3 |
| Melt flow index (g/10 min) | 20 | 40 | 30 | 21 |

TABLE 2

| Hydrogenated block copolymer | | | |
|---|---|---|---|
| | B-1 | B-2 | B-3 |
| Aromatic blocks (i) (wt %) | 13 | 30 | 29 |
| Melt flow index (g/10 min) | 9 | 13 | 0 |
| Tradename | KRATON-G 1657X | SEPTON 2002 | KRATON-G 1650 |

TABLE 3

| Amorphous ethylene-propylene block copolymer | | | |
|---|---|---|---|
| | C-1 | C-2 | C-3 |
| Propylene content (wt %) | 22 | 26 | 27 |
| Mooney viscosity | 19 | 24 | 42 |

TABLE 4

| | Talc | | | | |
|---|---|---|---|---|---|
| | D-1 | D-2 | D-3 | D-4 | D-5 |
| Median particle size $D_{p50}$ (μm) | 2.59 | 2.64 | 2.17 | 2.85 | 3.36 |
| Particles not smaller than 10 μm (wt %) | 0 | 0 | 0 | 1.8 | 0 |
| Particles not larger than 7 μm (wt %) | 91.3 | 92.4 | 90.9 | 92.5 | 91.5 |
| Particles not larger than 1 μm (wt %) | 7.3 | 4.4 | 11.7 | 9.0 | 2.9 |

Figure 2:
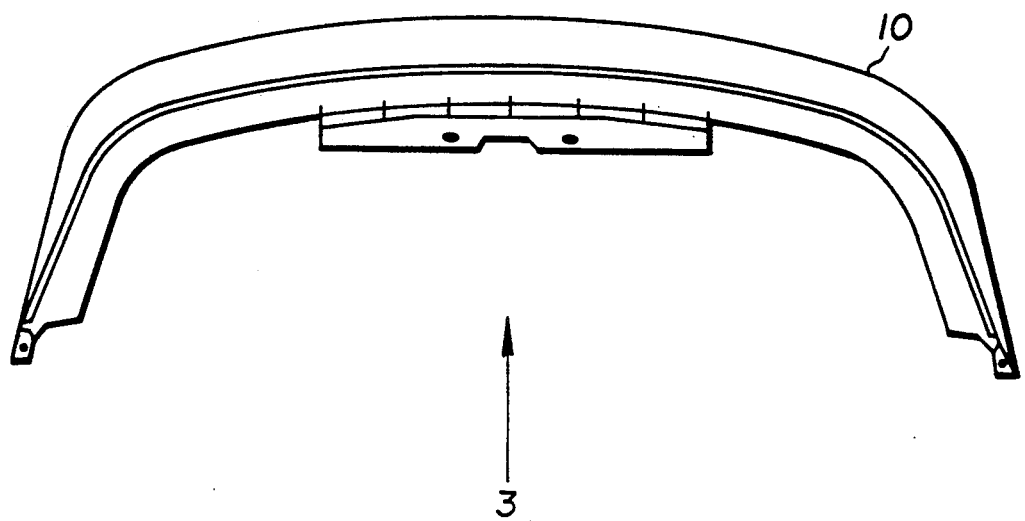
FIG. 2 is a plan view of an automobile bumper which was produced by molding an example of resin compositions according to the invention for evaluation of the resin composition.
Figure 3:
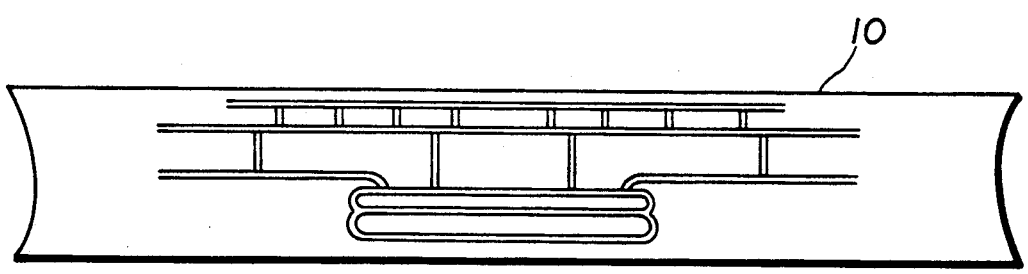
FIG. 3 is an elevational view of the bumper of FIG. 2 and shows the rear side of the bumper viewed from the direction or arrow 3 in FIG. 2.

In every example the following additives were added to 100 parts by weight of the mixture of the essential components (A), (B), (C) and (D): 0.1 part by weight of 2,6-di-tert-butyl-4-methylphenol, 0.2 part by weight of pentaerythrityl-tetrakis[3-(3,5-di-tert-butyl-4-hydroxyphenyl)propionate], 0.1 part by weight of octadecyl-3-(3,5-di-tert-butyl-4-hydroxyphenyl)propionate, 0.3 part by weight of bis(2,2,6,6-tetramethyl-4-piperidyl)-sebacate, 0.2 part by weight of magnesium stearate and 1.0 part by weight of carbon black. The essential components and the additives were mixed in a tumbling mixer, and the mixture was melted and kneaded with a high-speed twin-screw extruder at a temperature of 230° C., and the obtained resin composition was granulated. By injection molding the resin composition of each example was molded into test-pieces for the tests described hereinafter. Besides, the resin composition of every example was molded into an automobile bumper with a 2000-ton injection molding machine in which the resin temperature was controlled to 250° C. FIGS. 2 and 3 show the shape of the bumper 10 produced in the examples. Numeral 12 indicates hollow ribs of the bumper 10.

COMPARATIVE EXAMPLES 1-14

As shown in Table 5, in Comparative Examples 1-4 the resin composition of Example 1 was modified by using a crystalline ethylene-propylene block copolymer (A-3 or A-4) which does not fully satisfy the requirements of the invention or a hydrogenated block copolymer (B-3) which does not fully satisfy the requirements of the invention. As shown in Table 6, in Comparative Examples 5-8 the resin composition of Example 4 or 5 was modified by using an amorphous ethylene-propylene copolymer (C-3) which does not fully satisfy the requirements of the invention or talc (D-3, D-4 or D-5) which does not fully satisfy the requirements of the invention. In Comparative Example 9 the amount of the hydrogenated block copolymer (B-1) was outside the range specified in the invention. As shown in Table 7, the resin compositions of Comparative Examples 10-14 were not in accordance with the invention in respect of the amount of the hydrogenated block copolymer, amorphous ethylene-propylene copolymer or talc.

In every comparative example the additives used in Examples 1-5 were added to the basic components, and the resin composition was prepared by the same method as in Examples 1-5. The obtained resin compositions were injection molded into test-pieces, and the resin compositions of Comparative Examples 1, 4, 5 and 6 were molded into the bumpers shown in FIGS. 2 and 3.

The resin compositions of Examples 1-5 and Comparative Examples 1-14 were each subjected to measurement of melt flow index at 230° C. under load of 2.16 kg by the method according to JIS K 7210, and the following tests were made on the molded test-pieces of each resin composition. The results are shown in Tables 5 to 7.

(1) Modulus of elasticity in bending: measured by the method according to JIS K 7203.

(2) Izod impact strength: measured at −30° C. by the method according to JIS K 7110.

(3) High-speed falling weight impact strength

The test-pieces of the resin compositions were in the form of a disc 100 mm in diameter and 1.6 mm in thickness. Each test-piece was placed on a metal base formed with a through-hole having a diameter of 60 mm such that the test-piece was concentrical with the hole in the base, and a falling weight having a diameter of 25.4 mm (1 inch) was used to strike the test-piece at a speed of 2.5 cm/sec. The mass of the falling weight was variable to determine the kinetic energy needed to penetrate the test-piece. In this test every test-piece was kept cooled at −40° C. The testing machine was Model UTM-5 of Orientech Co.

(4) Paint coatability

A paint using a polyester-melamine resin as the vehicle was coated on the test-pieces and cured by heating at 120° C. for 30 min thereby to form a paint film having a thickness of 35 μm on each test-piece. The coated test-pieces were kept in a hot, moist atmosphere having a temperature of 50° C. and relative humidity of 95% for 240 hr. After that the test-pieces were visually examined whether the paint film had peeled or not. In Tables 5-7, "OK" means no peeling of the paint film, and "NG" means partial peeling of the paint film.

The resin bumpers produced in the examples and comparative examples were evaluated with respect to the following items. The results are shown in Tables 5 to 7.

(1) Appearance

Every bumper was observed with the naked eye to evaluate the gloss and detect surface defects such as local projections and dents, undulations, deformation, warping, unevenness of gloss, sink marks, silver streaks, tiger marks, etc. In Tables 5-7, "OK" means that the bumper had a good appearance with a good gloss, that none of the aforementioned surface defects were conspicuous before and after coating the bumper with a paint, and "NG" means that some surface defects were conspicuous or that the gloss was insufficient.

(2) Resistance to deformation

The bumper for testing was attached to a car body, and the bumper was struck with a hammer of a pendulum type at room temperature. In Tables 5-7, "OK" means that the amount (depth) of deformation of the bumper was less than 60 mm, and "NG" means that the amount of deformation reached 60 mm or more.

(3) Impact resistance at −30° C.

The above deforming test was made at −30° C. In Tables 5-7, "OK" means no breakage of the bumper, and "NG" means breakage of the bumper.

As can be seen in Tables 5-7, the resin compositions of Examples 1-5 were sufficiently high in both modulus of elasticity in bending and impact resistance and good in coatability, and the bumpers formed of these resin compositions were good in appearance and sufficiently high in rigidity and impact resistance. In contrast, the resin compositions of the comparative examples were unsatisfactory in respect of the mechanical characteristics, appearance or coatability of the molded products.

TABLE 5

|  |  | Ex. 1 | Ex. 2 | Ex. 3 | Comp. Ex. 1 | Comp. Ex. 2 | Comp. Ex. 3 | Comp. Ex. 4 |
| --- | --- | --- | --- | --- | --- | --- | --- | --- |
| Composition (parts by wt.) | | | | | | | | |
| Crystalline E-P Copolymer | A-1 | 61 | 50 | 62 | — | — | 61 | 30 |
| Crystalline E-P Copolymer | A-2 | — | 10 | — | — | — | — | — |
| Crystalline E-P Copolymer | A-3 | — | — | — | 61 | — | — | 31 |
| Crystalline E-P Copolymer | A-4 | — | — | — | — | 61 | — | — |
| Hydrogenated Block Copolymer | B-1 | 15 | 16 | — | 15 | 15 | — | 15 |
| Hydrogenated Block Copolymer | B-2 | — | — | 14 | — | — | — | — |
| Hydrogenated Block Copolymer | B-3 | — | — | — | — | — | 15 | — |
| Amorphous E-P Copolymer | C-1 | 3 | 3 | 3 | 3 | 3 | 3 | 3 |
| Talc | D-1 | 21 | 21 | 21 | 21 | 21 | 21 | 21 |
| Characteristics | | | | | | | | |
| Melt Flow Index (g/10 min) | | 17.5 | 19.2 | 17.9 | 25.2 | 17.7 | 16.8 | 21.5 |
| Elastic Modulus in Bending (kg/cm$^2$) | | 19700 | 19500 | 18900 | 20900 | 20500 | 19500 | 20200 |
| Izod Impact at −30° C. (kg-cm/cm) | | 6.8 | 6.7 | 7.3 | 4.5 | 4.2 | 4.8 | 5.1 |
| Falling Weight Impact at −40° C. (kg-cm) | | 456 | 448 | 453 | 375 | 389 | 394 | 398 |
| Paint Coatability | | OK | OK | OK | OK | NG | OK | OK |
| Molded Bumper | | | | | | | | |
| Appearance | | OK | OK | OK | NG | — | — | OK |
| Amount of Deformation | | OK | OK | OK | OK | — | — | OK |
| Impact Resistance at −30° C. | | OK | OK | OK | NG | — | — | NG |
| Overall Evaluation | | superior | superior | superior | inferior | inferior | inferior | inferior |

TABLE 6

|  |  | Ex. 4 | Ex. 5 | Comp. Ex. 5 | Comp. Ex. 6 | Comp. Ex. 7 | Comp. Ex. 8 | Comp. Ex. 9 |
| --- | --- | --- | --- | --- | --- | --- | --- | --- |
| Composition (wt %) | | | | | | | | |
| Crystalline E-P Copolymer | A-1 | 61 | 65 | 61 | 65 | 65 | 65 | 65 |
| Hydrogenated Block Copolymer | B-1 | 15 | 13 | 15 | 13 | 13 | 13 | 9 |
| Amorphous E-P Copolymer | C-1 | — | 3 | — | 3 | 3 | 3 | 7 |
| Amorphous E-P Copolymer | C-2 | 3 | — | — | — | — | — | — |
| Amorphous E-P Copolymer | C-3 | — | — | 3 | — | — | — | — |
| Talc | D-1 | 21 | — | 21 | — | — | — | 19 |
| Talc | D-2 | — | 19 | — | — | — | — | — |
| Talc | D-3 | — | — | — | 19 | — | — | — |
| Talc | D-4 | — | — | — | — | 19 | — | — |
| Talc | D-5 | — | — | — | — | — | 19 | — |
| Characteristics | | | | | | | | |
| Melt Flow Index (g/10 min) | | 7.3 | 17.7 | 16.9 | 16.0 | 16.8 | 17.4 | 15.8 |
| Elastic Modulus in Bending (kg/cm$^2$) | | 19600 | 19300 | 19400 | 19000 | 19200 | 19200 | 18600 |
| Izod Impact at −30° C. (kg-cm/cm) | | 6.6 | 6.5 | 6.2 | 5.2 | 5.0 | 4.9 | 5.1 |
| Falling Weight Impact at −40° C. (kg-cm) | | 438 | 444 | 402 | 413 | 397 | 404 | 392 |
| Paint Coatability | | OK | OK | OK | OK | OK | OK | OK |
| Molded Bumper | | | | | | | | |
| Appearance | | OK | OK | NG | OK | — | — | — |
| Amount of Deformation | | OK | OK | OK | OK | — | — | — |
| Impact Resistance at −30° C. | | OK | OK | OK | NG | — | — | — |
| Overall Evaluation | | superior | superior | inferior | inferior | inferior | inferior | inferior |

TABLE 7

|  |  | Comp. Ex. 10 | Comp. Ex. 11 | Comp. Ex. 12 | Comp. Ex. 13 | Comp. Ex. 14 |
| --- | --- | --- | --- | --- | --- | --- |
| Composition (wt %) | | | | | | |
| Crystalline E-P Copolymer | A-1 | 61 | — | 61 | 50 | 69 |
| Crystalline E-P Copolymer | A-2 | — | 50 | — | — | — |
| Hydrogenated Block Copolymer | B-1 | 18 | 21 | 8 | 15 | 14 |
| Amorphous E-P Copolymer | C-2 | 0 | 4 | 10 | 5 | 4 |
| Talc | D-1 | 21 | 25 | 21 | 30 | 13 |

TABLE 7-continued

|  | Comp. Ex. 10 | Comp. Ex. 11 | Comp. Ex. 12 | Comp. Ex. 13 | Comp. Ex. 14 |
|---|---|---|---|---|---|
| Characteristics |  |  |  |  |  |
| Melt Flow Index (g/10 min) | 18.1 | 21.1 | 16.3 | 14.5 | 19.8 |
| Elastic Modulus in Bending (kg/cm$^2$) | 19800 | 16800 | 19000 | 22300 | 15100 |
| Izod Impact at −30° C. (kg-cm/cm) | 6.7 | 7.4 | 4.8 | 2.2 | 10.8 |
| Falling Weight Impact at −40° C. (kg-cm) | 442 | 465 | 398 | 314 | 590 |
| Paint Coatability | NG | OK | OK | NG | OK |
| Molded Bumper |  |  |  |  |  |
| Appearance | — | OK | — | — | — |
| Amount of Deformation | — | NG | — | — | — |
| Impact Resistance at −30° C. | — | OK | — | — | — |
| Overall Evaluation | inferior | inferior | inferior | inferior | inferior |

What is claimed is:

1. A resin composition suitable for molding into automobile bumpers, comprising:
   (A) 50–73 wt % of at least one crystalline ethylene-propylene block copolymer which contains 5–15 wt % of ethylene and has a melt flow index of 10–50 g/10 min at 230° C. under load of 2.16 kg, at least 93 wt % but less than 97 wt % of the polypropylene component of the block copolymer being insoluble in boiling n-heptane, a fraction of the block copolymer which is soluble in p-xylene at normal temperature having an intrinsic viscosity not lower than 2.5 in decahydronaphthalene at 135° C.;
   (B) 10–20 wt % of at least one hydrogenated block copolymer which consists of (i) 10–40 wt % of first blocks of a polymer of an aromatic vinyl compound and (ii) 90–60 wt % of second blocks of a polymer of a conjugated diene and has a melt flow index not lower than 1 g/10 min at 230° C. under load of 2.16 kg, not more than 5 mol % of said first blocks and at least 90 mol % of said second blocks being hydrogenated;
   (C) 2–7 wt % of an amorphous ethylene-propylene copolymer which contains 20–30 wt % of propylene and has a Mooney viscosity, $ML_{1+4}(100°\ C.)$, in the range from 10 to 30; and
   (D) 15–25 wt % of talc which has a median particle size, $Dp_{50}$, in the range from 1.5 to 3.0 μm, the particle size distribution of the talc being such that particles smaller than 10 μm amount to 100 wt %, that the amount of particles not larger than 7 μm is not less than 90 wt % and that the amount of particles not larger than 1 μm is not more than 10 wt %;
   with the proviso that the total amount of said at least one hydrogenated block copolymer (B) and said amorphous ethylene-propylene copolymer (C) falls in the range from 12 to 25 wt % of the resin composition.

2. A resin composition according to claim 1, wherein said at least one crystalline ethylene-propylene block copolymer (A) amounts to 54–68 wt % of the resin composition.

3. A resin composition according to claim 1, wherein the content of ethylene in said crystalline ethylene-propylene block copolymer is not more than 10 wt %.

4. A resin composition according to claim 1, wherein said melt flow index of said crystalline ethylene-propylene block copolymer is in the range from 10 to 40 g/10 min.

5. A resin composition according to claim 1, wherein said at least one hydrogenated block copolymer (B) amounts to 12–18 wt % of the resin composition.

6. A resin composition according to claim 1, wherein in said hydrogenated block copolymer the amount of said first blocks (i) is not more than 30 wt %.

7. A resin composition according to claim 1, wherein in said hydrogenated block copolymer at least 97 mol % of said second blocks (ii) is hydrogenated.

8. A resin composition according to claim 1, wherein in said hydrogenated block copolymer said aromatic vinyl compound is selected from the group consisting of styrene, α-methylstyrene, p-methylstyrene and chlorostyrene.

9. A resin composition according to claim 1, wherein in said hydrogenated block copolymer said conjugated diene is selected from the group consisting of butadiene, isoprene and chloroprene.

10. A resin composition according to claim 1, wherein said melt flow index of said hydrogenated block copolymer is not lower than 5 g/10 min.

11. A resin composition according to claim 1, wherein said amorphous ethylene-propylene copolymer (C) amounts to 3–5 wt % of the resin composition.

12. A resin composition according to claim 1, wherein said Mooney viscosity of said amorphous ethylene-propylene copolymer is not higher than 25.

13. A resin composition according to claim 1, wherein the total amount of said at least one hydrogenated block copolymer (B) and said amorphous ethylene-propylene copolymer (C) is 15–22 wt %.

14. A resin composition according to claim 1, wherein said talc (D) amounts to 17–24 wt % of the resin composition.

15. A resin composition according to claim 1, further comprising an antioxidant.

16. A resin composition according to claim 1, further comprising an ultraviolet ray absorbing agent.

17. A resin composition according to claim 1, further comprising a pigment.

18. A resin composition according to claim 1, further comprising a coatability improving agent.

19. A resin composition according to claim 1, further comprising a lubricating agent.

20. A resin composition according to claim 1, which is not lower than 17000 kg/cm$^2$ in modulus of elasticity in bending and not lower than 6 kg-cm/cm in Izod impact strength at −30° C.

21. A resin composition suitable for molding into automobile bumpers, comprising:
   (A) 54–68 wt % of at least one crystalline ethylene-propylene block copolymer which contains 5–15 wt % of ethylene and has a melt flow index of 10–50 g/10 min at 230° C. under load of 2.16 kg, at least 93 wt % but less than 97 wt % of the polypropylene component of the block copolymer being insoluble in boiling n-heptane, a fraction of the block copolymer which is soluble in p-xylene at normal temperature having an intrinsic viscosity not lower than 2.5 in decahydronaphthalene at 135° C.;

(B) 12–18 wt % of at least one hydrogenated block copolymer which consists of (i) 10–40 wt % of first blocks of a polymer of an aromatic vinyl compound and (ii) 90–60 wt % of second blocks of a polymer of a conjugated diene and has a melt flow index not lower than 1 g/10 min at 230° C. under load of 2.16 kg, not more than 5 mol % of said first blocks and at least 90 mol % of said second blocks being hydrogenated;

(C) 3–5 wt % of an amorphous ethylene-propylene copolymer which contains 20–30 wt % of propylene and has a Mooney viscosity, $ML_{1+4}$(100° C.), in the range from 10 to 30; and (D) 17–24 wt % of talc which has a median particle size, $D_{p50}$, in the range from 1.5 to 3.0 μm, the particle size distribution of the talc being such that particles smaller than 10 μm amount to 100 wt %, that the amount of particles not larger than 7 μm is not less than 90 wt % and that the amount of particles not larger than 1 μm is not more than 10 wt %;

with the proviso that the total amount of said at least one hydrogenated block copolymer (B) and said amorphous ethylene-propylene copolymer (C) falls in the range from 15 to 22 wt % of the resin composition.

22. A resin composition according to claim 21, wherein the content of ethylene in said crystalline ethylene-propylene block copolymer is not more than 10 wt %.

23. A resin composition according to claim 21, wherein said melt flow index of said crystalline ethylene-propylene block copolymer is in the range from 10 to 40 g/10 min.

24. A resin composition according to claim 21, wherein in said hydrogenated block copolymer the amount of said first blocks (i) is not more than 30 wt %.

25. A resin composition according to claim 21, wherein in said hydrogenated block copolymer at least 97 mol % of said second blocks (ii) is hydrogenated.

26. A resin composition according to claim 21, wherein in said hydrogenated block copolymer said aromatic vinyl compound is selected from the group consisting of styrene, α-methylstyrene, p-methylstyrene and chlorostyrene.

27. A resin composition according to claim 21, wherein in said hydrogenated block copolymer said conjugated diene is selected from the group consisting of butadiene, isoprene and chloroprene.

28. A resin composition according to claim 21, wherein said melt flow index of said hydrogenated block copolymer is not lower than 5 g/10 min.

29. A resin composition according to claim 21, wherein said Mooney viscosity of said amorphous ethylene-propylene copolymer is not higher than 25.

30. A resin composition according to claim 21, further comprising an antioxidant.

31. A resin composition according to claim 21, further comprising an ultraviolet ray absorbing agent.

32. A resin composition according to claim 21, further comprising a pigment.

33. A resin composition according to claim 21, further comprising a coatability improving agent.

34. A resin composition according to claim 21, further comprising a lubricating agent.

35. A resin composition according to claim 21, which is not lower than 17000 kg/cm² in modulus of elasticity in bending and not lower than 6 kg-cm/cm in Izod impact strength at −30° C.

36. A resin composition suitable for molding into automobile bumpers, consisting essentially of:

(A) 50–73 wt % of at least one crystalline ethylene-propylene block copolymer which contains 5–15 wt % of ethylene and has a melt flow index of 10–50 g/10 min at 230° C. under load of 2.16 kg, at least 93 wt % but less than 97 wt % of the polypropylene component of the block copolymer being insoluble in boiling n-heptane, a fraction of the block copolymer which is soluble in p-xylene at normal temperature having an intrinsic viscosity not lower than 2.5 in decahydronaphthalene at 135° C.;

(B) 10–20 wt % of at least one hydrogenated block copolymer which consists of (i) 10–40 wt % of first blocks of a polymer of an aromatic vinyl compound and (ii) 90–60 wt % of second blocks of a polymer of a conjugated diene and has a melt flow index not lower than 1 g/10 min at 230° C. under load of 2.16 kg, not more than 5 mol % of said first blocks and at least 90 mol % of said second blocks being hydrogenated;

(C) 2–7 wt % of an amorphous ethylene-propylene copolymer which contains 20–30 wt % of propylene and has a Mooney viscosity, $ML_{1+4}$(100° C.), in the range from 10 to 30; and (D) 15–25 wt % of talc which has a median particle size, $D_{p50}$, in the range from 1.5 to 3.0 μm, the particle size distribution of the talc being such that particles smaller than 10 μm amount to 100 wt %, that the amount of particles not larger than 7 μm is not less than 90 wt % and that the amount of particles not larger than 1 μm is not more than 10 wt %;

with the proviso that the total amount of said at least one hydrogenated block copolymer (B) and said amorphous ethylene-propylene copolymer (C) falls in the range from 12 to 25 wt % of the resin composition.

37. A resin composition suitable for molding into automobile bumpers, consisting essentially of:

(A) 54–68 wt % of at least one crystalline ethylene-propylene propylene block copolymer which contains 5–15 wt % of ethylene and has a melt flow index of 10–50 g/10 min at 230° C. under load of 2.16 kg, at least 93 wt % but less than 97 wt % of the polypropylene component of the block copolymer being insoluble in boiling n-heptane, a fraction of the block copolymer which is soluble in p-xylene at normal temperature having an intrinsic viscosity not lower than 2.5 in decahydronaphthalene at 135° C.;

(B) 12–18 wt % of at least one hydrogenated block copolymer which consists of (i) 10–40 wt % of first blocks of a polymer of an aromatic vinyl compound and (ii) 90–60 wt % of second blocks of a polymer of a conjugated diene and has a melt flow index not lower than 1 g/10 min at 230° C. under load of 2.16 kg, not more than 5 mol % of said first blocks and at least 90 mol % of said second blocks being hydrogenated;

(C) 3–5 wt % of an amorphous ethylene-propylene copolymer which contains 20–30 wt % of propylene and has a Mooney viscosity, $ML_{1+4}$ (100° C.), in the range from 10 to 30; and (D) 17–24 wt % of talc which has a median particle size, $D_{p50}$, in the range from 1.5 to 3.0 µm, the particle size distribution of the talc being such that particles smaller than 10 µm amount to 100 wt %, that the amount of particles not larger than 7 µm is not less than 90 wt % and that the amount of particles not larger than 1 µm is not more than 10 wt %;

with the proviso that the total amount of said at least one hydrogenated block copolymer (B) and said amorphous ethylene-propylene copolymer (C) falls in the range from 15 to 22 wt % of the resin composition.

* * * * *